(No Model.) 3 Sheets—Sheet 1.

J. BABCOCK.
DEVICE FOR SALTING LIVE STOCK.

No. 369,155. Patented Aug. 30, 1887.

ATTEST
J. D. Walker.
C. C. Clark.

INVENTOR
James Babcock.
By L. P. Graham
his attorney.

(No Model.) 3 Sheets—Sheet 2.

J. BABCOCK.
DEVICE FOR SALTING LIVE STOCK.

No. 369,155. Patented Aug. 30, 1887.

ATTEST
J. D. Walker
C. C. Clark

INVENTOR
James Babcock
By L. P. Graham
his attorney (No Model.) 3 Sheets—Sheet 3.

J. BABCOCK.
DEVICE FOR SALTING LIVE STOCK.

No. 369,155. Patented Aug. 30, 1887.

ATTEST
O. D. Walker
C. C. Clark

INVENTOR
James Babcock
By L. P. Graham
his attorney

UNITED STATES PATENT OFFICE.

JAMES BABCOCK, OF OREANA, ILLINOIS.

DEVICE FOR SALTING LIVE STOCK.

SPECIFICATION forming part of Letters Patent No. 369,155, dated August 30, 1887.

Application filed March 21, 1887. Serial No. 231,703. (No model.)

*To all whom it may concern:*

Be it known that I, JAMES BABCOCK, of Oreana, in the county of Macon and State of Illinois, have invented a certain new and useful Automatic Device for Salting Live Stock, of which the following is a specification.

My device is especially designed for use on farms or wherever several animals intermingle in the same inclosure, it being capable of holding a large supply of salt constantly accessible to the animals and completely protected from rain-fall.

Figure 1:
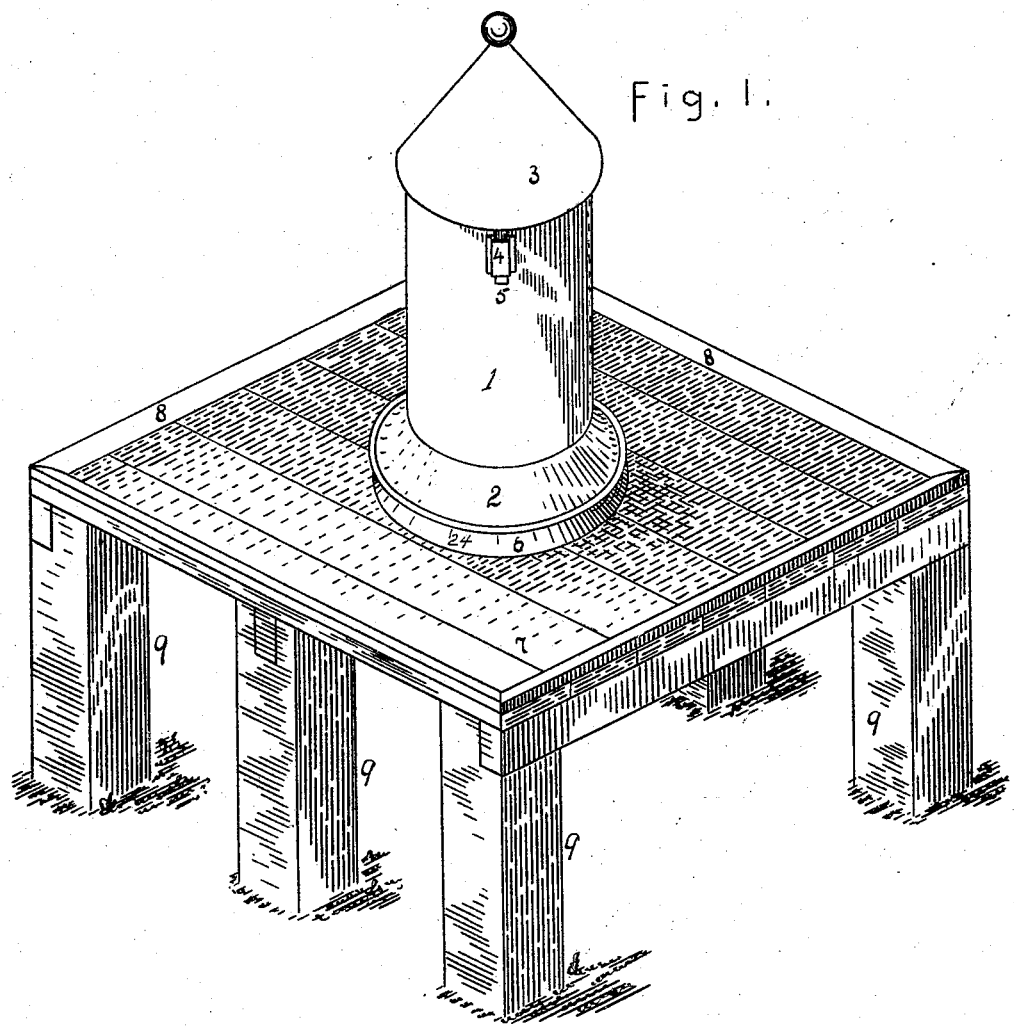
Figure 2:
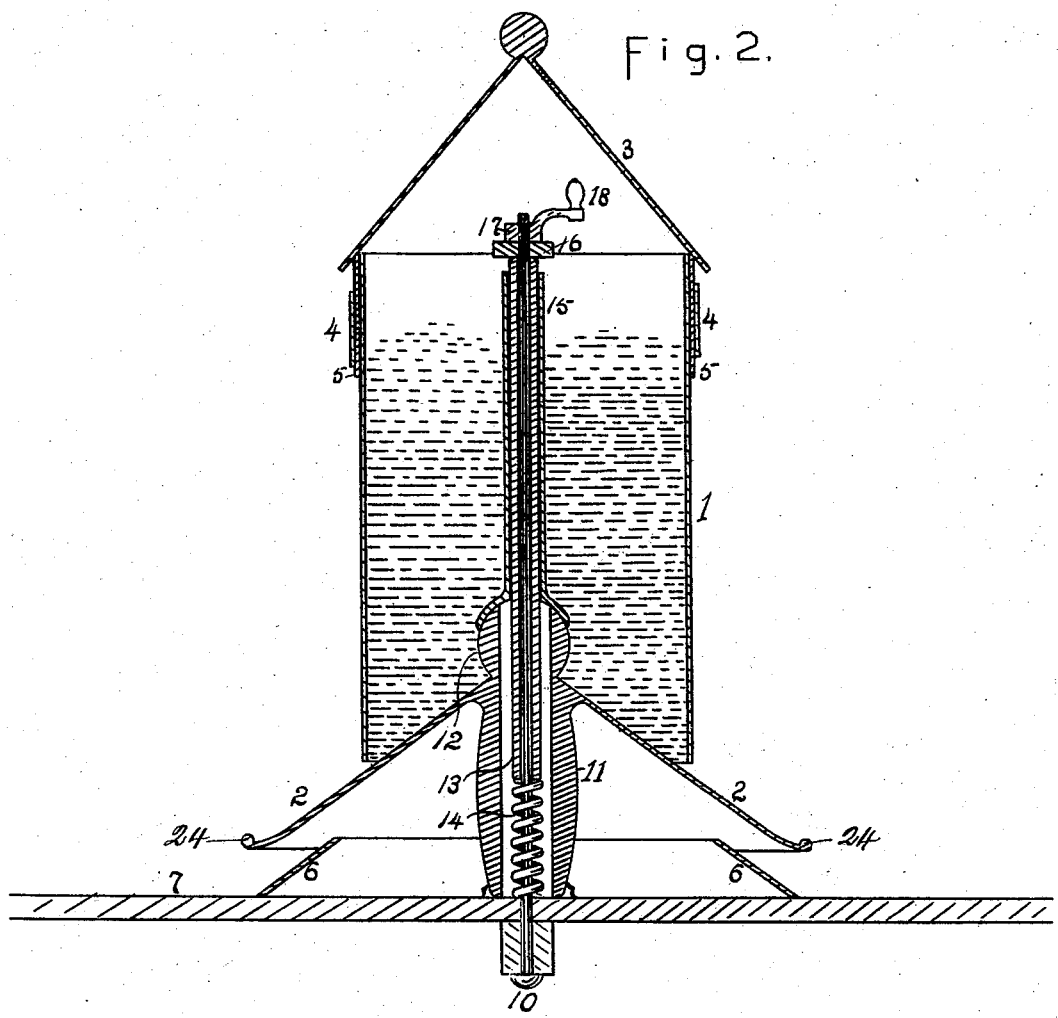
Figure 3:
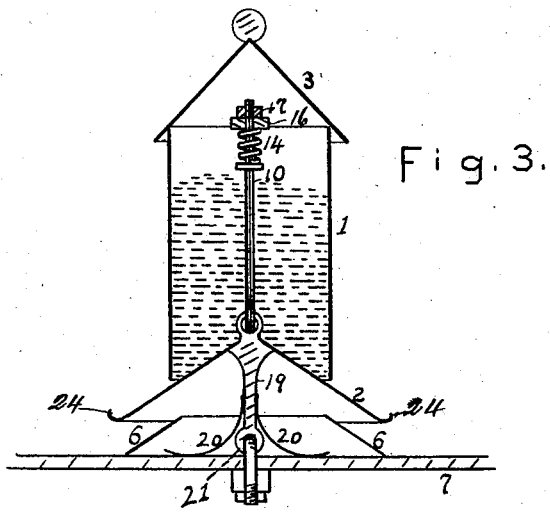
Figure 4:
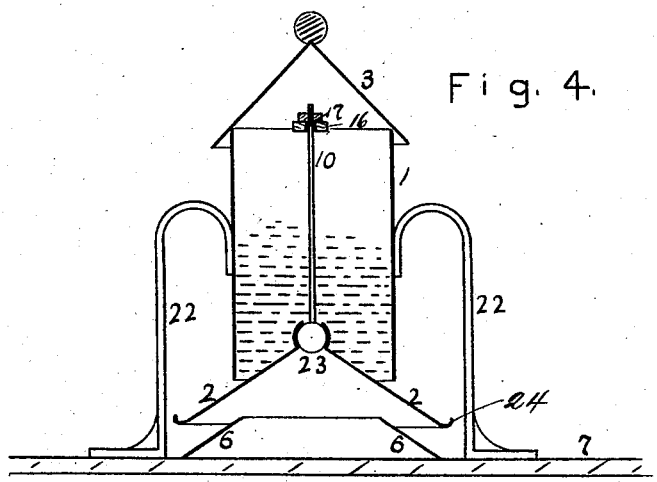

In the drawings accompanying and forming a part of this specification, Figure 1 represents my device in isometrial perspective. Fig. 2 is a central vertical section of the essential portions of the same. Figs. 3 and 4 are central vertical sections of modifications of my device.

The salt is contained in a receptacle, 1, which is preferably in the form of a hollow cylinder, and said receptacle is provided with a cover, 3, which should be firmly secured in a manner permitting detachment. The plate 2 inclines upwardly in the receptacle at an obtuse angle and extends beyond the perimeter of the same, where it terminates in the annular upper rib or flange, 24. The receptacle and all its concomitants are supported on a suitable frame, and said frame may be formed of posts 9, platform 7, and circumscribing ledge 8, or in any suitable manner. The plate 2 is supported from the platform through tubular stock 11, which terminates above the plate in the spherical head 12. A bolt, 10, threaded at its upper end, extends through the platform, the tubular stock, and the diametrical bar 16, which is firmly secured to the upper end of the receptacle at opposite sides thereof. The bolt is provided with nut 17 over the cross-bar, and crank-arm 18 provides ready means for adjusting said nut. The receptacle is elastically supported from the platform through tube 13 and spring 14. The aperture in the stock is larger than the external diameter of the support 13 and spring 14, in order that the plate 2 may have a tilting or oscillatory motion, and the consequent opening at its upper end is closed to the exclusion of salt by the spherical lower termination of tube 15, which conforms to head 12.

The receptacle is held out of contact with the plate 2 by means of the elastic support 13 14, and the extent of the disconnection and consequent discharge of salt is regulated by the bolt and nut, which enables the receptacle to be forced in close contact with the plate when desired.

In operation the receptacle is supplied with salt and the cover firmly secured. The space between the receptacle and the plate permits the passage of salt, which will ordinarily descend by force of gravity until obstructed by an accumulation on the outer portion of the plate. This obstruction is in time removed by the animals, and the discharge is continued with an irregular intermittency, depending on the extent of use; but salt is not of uniform fineness, lumps prevail, and an excess of moisture, even in the atmosphere, will result in a packed condition that will affect the discharge. To meet these and possibly other emergencies, the plate has a tilting motion when subjected to pressure at any point of its exposed surface, and the irregularly-applied pressure resulting from the efforts of the animals to obtain salt effects an irregular oscillation that agitates the salt and temporarily increases the extent of the opening at the point where pressure is applied.

The oscillatory motion of the plate is to some extent re-enforced in its salt-discharging capabilities by the construction that permits rotary motion of the stock, and under extreme circumstances allowance may be made by manipulating the nut and increasing or decreasing the space between the receptacle and the plate.

The top, as shown, has vertical guides 5, that slide in guideways 4 on the receptacle; but other means for securing the top to the receptacle in a manner permitting ready detachment by manipulation will occur to any one skilled in the art.

The salt that falls on the platform is retained by ledge 8 and prevented from packing injuriously under the plate by annular guard 6.

It will be understood from the above explanation that the essential features of my invention are the covered receptacle and the inclined partially-exposed plate having an independent tilting, oscillatory, or pendulous motion, the receptacle and plate having vertical adjustment with relation to each other.

In Fig. 3, 19 shows a modified form of stock, which is secured to the platform at 21 by a universal-joint coupling and elastically braced by springs 20, and the rod 10, that supports the receptacle, is loosely joined to the head and provided with a collar on which the spring rests.

In Fig. 4 the spring is dispensed with, the receptacle is rigidly held by external supports 22, and the plate is pendulously supported by ball 23, that permits the required tilting motion.

The independent motion of the plate and the requisite adjustment of parts are obtained in the modifications; but the principal device is considered preferable, for the reason that it is more stable than the Fig. 3 modification and has not the obstructing external supports shown in Fig. 4.

As before stated, the cylindrical form of receptacle is preferred; but so long as the plate conforms to the receptacle variations may be made in form without affecting the general operation of the device.

I claim as new and desire to secure by Letters Patent—

1. In a live-stock-salting device, in combination, the platform, the inclined plate, supported by the tubular stock, the receptacle over the plate, having the diametrical bar at its upper portion, the rod extending from the platform through the diametrical bar and threaded at its upper end, the adjusting-nut on the rod above the bar, the elastic support resting on the platform and sustaining the receptacle through the diametrical bar, and the cover for the receptacle, as and for the purpose set forth.

2. In a live-stock-salting device, in combination, the platform, the inclined plate having the peripheral flange upwardly projecting, the tubular plate-supporting stock resting on the platform and provided with the spherical head, the receptacle over the plate, having the diametrical bar at its upper portion, the rod extending through the platform, the receptacle, and the diametrical bar, the adjusting-nut on the rod above the bar, the elastic support encircling the rod and extending from the platform to the bar, the tube having the spherical concavity adapted to the head of the stock, and the cover for the receptacle.

JAMES BABCOCK.

Attest:
C. C. CLARK,
L. P. GRAHAM.